(12) United States Patent
Brueckner et al.

(10) Patent No.: US 10,452,926 B2
(45) Date of Patent: Oct. 22, 2019

(54) IMAGE CAPTURE DEVICE WITH CUSTOMIZABLE REGIONS OF INTEREST

(71) Applicant: Uber Technologies, Inc., San Francisco, CA (US)

(72) Inventors: Peter Brueckner, Pittsburgh, PA (US); Carl Wellington, Pittsburgh, PA (US); David Driscoll, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 250 days.

(21) Appl. No.: 15/393,306

(22) Filed: Dec. 29, 2016

(65) Prior Publication Data

US 2018/0189574 A1    Jul. 5, 2018

(51) Int. Cl.

| G06K 9/46 | (2006.01) |
| G06K 9/20 | (2006.01) |
| H04N 19/167 | (2014.01) |
| H04N 19/10 | (2014.01) |
| G06K 9/00 | (2006.01) |
| H04N 5/232 | (2006.01) |
| H04N 7/18 | (2006.01) |

(52) U.S. Cl.
CPC ..... *G06K 9/00791* (2013.01); *G06K 9/00805* (2013.01); *G06K 9/2081* (2013.01); *G06K 9/4604* (2013.01); *H04N 5/23235* (2013.01); *H04N 7/183* (2013.01); *H04N 19/10* (2014.11); *H04N 19/167* (2014.11)

(58) Field of Classification Search
None
See application file for complete search history.

(56) References Cited

U.S. PATENT DOCUMENTS

| 2012/0200703 A1* | 8/2012 | Nadir | G02B 27/644 |
| | | | 348/144 |
| 2016/0007026 A1* | 1/2016 | Dong | H04N 19/176 |
| | | | 375/240.08 |
| 2016/0034771 A1* | 2/2016 | Schamp | G01B 11/2545 |
| | | | 348/148 |
| 2016/0191946 A1* | 6/2016 | Zhou | H04N 19/523 |
| | | | 375/240.16 |

OTHER PUBLICATIONS

Bradley AP, Stentiford FW. JPEG 2000 and region of interest coding. InDigital Image Computing Techniques and Applications Jan. 21, 2002 (vol. 2, pp. 1-6). (Year: 2002).*

* cited by examiner

*Primary Examiner* — Clifford Hilaire
(74) *Attorney, Agent, or Firm* — Dority & Manning, PA

(57) ABSTRACT

An image capture device can include one or more image sensors and one or more image processors. The image sensor(s) can be configured to detect incoming light provided incident to a surface of each image sensor, each image sensor configured to provide full image frames of image capture data at a first resolution. The image processor(s) can be coupled to the image sensor(s) and configured to receive the image capture data at the first resolution, downsample the image capture data outside one or more regions of interest, and provide a digital image output having a second resolution within the one or more regions of interest and a third resolution outside the one or more regions of interest, wherein the third resolution is less than the second resolution.

20 Claims, 5 Drawing Sheets

IMAGE CAPTURE DEVICE WITH CUSTOMIZABLE REGIONS OF INTEREST

FIELD

The present disclosure relates generally to an image capture device, and more particularly to an image capture device and image processing system that dynamically determines customizable regions of interest.

BACKGROUND

Sensors are increasingly used in vehicle applications to help provide useful information associated with vehicle operation. For example, image sensors found in cameras or other image capture devices can be used to capture images of an operating environment surrounding a vehicle. In autonomous vehicles, cameras and other sensors can be used to help determine vehicle position from sensor data identifying various aspects of the vehicle's surroundings. High performance image sensors can capture image data characterized by an increasingly large file size, especially as successive images are stored over time. Local data storage capacities within a vehicle can reach a maximum level relatively quickly when capturing, storing and analyzing such high volumes of image data.

SUMMARY

Aspects and advantages of embodiments of the present disclosure will be set forth in part in the following description, or may be learned from the description, or may be learned through practice of the embodiments.

One example aspect of the present disclosure is directed to an image capture device. The image capture device can include one or more image sensors and one or more image processors coupled to the one or more image sensors. The one or more image sensors can be configured to detect incoming light provided incident to a surface of each image sensor. Each image sensor can be configured to provide multiple full image frames of image capture data at a first resolution. The one or more image processors can be configured to receive the image capture data at the first resolution, downsample the image capture data outside one or more regions of interest, and provide a digital image output having a second resolution within the one or more regions of interest and a third resolution outside the one or more regions of interest, wherein the third resolution is less than the second resolution.

Yet another example aspect of the present disclosure is directed to a vehicle computing system including one or more computing devices and an image capture device. The one or more computing devices can be configured to receive one or more portions of environmental factor data comprising real time data indicative of one or more environmental factors defining the operational environment of an image capture device positioned relative to a vehicle. The one or more computing devices can also be configured to dynamically determine one or more regions of interest within an image frame based at least in part on the one or more portions of environmental factor data. The image capture device can be positioned relative to the vehicle and can include one or more image sensors and one or more image processors. The image capture device can detect incoming light provided incident to a surface of each image sensor, each image sensor configured to provide image capture data at a first resolution. The one or more image processors can be coupled to the one or more image sensors for receiving the image capture data at the first resolution, downsampling the image capture data outside the one or more regions of interest, and providing a digital image output having a second resolution within the one or more regions of interest and a third resolution outside the one or more regions of interest.

A still further example aspect of the present disclosure is directed to a method. The method can include detecting, by one or more image sensors of an image capture device, full image frames of raw image capture data indicative of an amount of incident light present at each image sensor, wherein the raw image capture data is characterized by a first resolution. The method can also include determining, by one or more processing devices, one or more regions of interest within the full image frames of raw image capture data. The one or more regions of interest can be determined based at least in part on one or more portions of environmental factor data including real time data indicative of one or more environmental factors defining the operational environment of the image capture device as positioned relative to a vehicle. The method also can include generating, by the one or more processing devices, a digital image output characterized by a second resolution within the one or more regions of interest and a third resolution outside the one or more regions of interest.

Other example aspects of the present disclosure are directed to systems, methods, apparatuses, tangible, non-transitory computer-readable media, user interfaces, memory devices, and vehicles including image detection and processing features.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
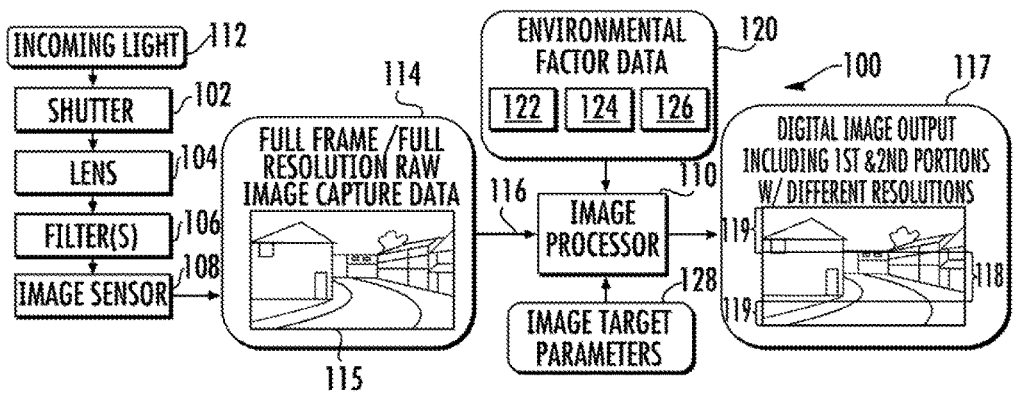
FIG. 1 depicts an example image capture device according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to obtaining images for use in vehicle applications. Regions of interest can be dynamically determined within an image frame based on real-time environmental factor data characterizing the operational environment of the image capture device and associated vehicle. The regions of interest can be dynamically determined within a target field of view having a smaller area than full image frames of an image sensor. Example real-time environmental factor data can include, for example, terrain data associated with a vehicle's current geographic location, orientation data indicating an orientation of the image capture device as positioned relative to the vehicle, and/or sensed object data identifying the location of sensed objects near the vehicle. Image sensors can detect full image frames of raw image capture data characterized by a given resolution. Digital image outputs can be generated having a second resolution within the one or more regions of interest and a third resolution outside the one or more regions of interest, wherein the third resolution is less than the second resolution. In some examples, the second resolution is the same as the first resolution although the second can be less than the first resolution in other examples. Digital image outputs having different resolutions inside and outside the regions of interest provide a focused field of view on relevant image portions for specific applications while reducing file size and computational bandwidth for subsequent image processing. The enhanced digital images then can be further analyzed in autonomous vehicle applications, such as those involving object detection and vehicle control.

More particularly, an image capture device can include one or more image sensors and one or more image processors. Each image sensor can be, for example, a charge-coupled device (CCD) sensor or a complementary metal-oxide-semiconductor (CMOS) sensor and can include an array of sensor elements capable of detecting incoming light provided incident to a surface of the image sensor. The image sensor can be configured to capture successive image frames of raw image capture data at a first resolution. In some examples, the first resolution of the image sensor corresponds to the full frame or full resolution capability when operating the image sensor for maximum possible image quality and resolution.

An image capture device also can include one or more image processing devices (e.g., image processors). The image processor(s), e.g., a field-programmable gate array (FPGA) provided within the image capture device, can be coupled to the image sensor(s) via one or more image interface protocols (e.g., Low-Voltage Differential Signaling (LVDS)). The image processor(s) can receive the raw image capture data at the first resolution, downsample the raw image capture data in one or more reduced resolution image portions, and generate a digital image output from processed raw image capture data downsampled in the reduced resolution image portions and raw image capture data from other portions of each image frame. The digital image output can be characterized as having a second resolution inside one or more regions of interest and a third resolution outside the one or more regions of interest. In some examples, the area outside the region(s) of interest can correspond to the reduced resolution image portions with downsampled image capture data. In some examples, the area inside the region(s) of interest having a second resolution is such that the second resolution corresponds to the first resolution, e.g., the same full frame/full resolution capability of the image sensor within that portion of the image. In such examples, the raw image capture data obtained by the image sensor within the region(s) of interest can be retained without downsampling. In some examples, the resolution of the various images and image portions (e.g., the first resolution, the second resolution and the third resolution) can be measured based on a quantity such as pixels per unit, pixels per degree, angular resolution, spatial resolution, and/or instantaneous field of view (IFOV) measured in terms of radians (rad) or milliradians (mrad).

One or more processing devices within the image capture device or otherwise coupled to the image capture device can help determine one or more regions of interest in a dynamic fashion based on real time environmental factor data provided as input. In some examples, the environmental factor data can include terrain data that provides elevation values for a terrain associated with the current geographic location of a vehicle. In some examples, the environmental factor data can include sensed object data that provides location data for one or more sensed objects around a vehicle. In some examples, the environmental factor data can include orientation data that indicates an orientation of the image capture device as positioned relative to a vehicle. In some examples, the region(s) of interest can actively shift across an entire image frame as determined from the environmental factor data. In other examples, the region(s) of interest can be determined within a target field of view defined by certain dimensions and/or boundary limitations.

One or more processing devices also can determine region(s) of interest or other aspects of image downsampling and digital image output generation based on one or more image target parameters. Image target parameters can include image file size, resolution, target field of view, dimension (e.g., length, width or height), area, center point, or the like. The image target parameters can be defined in terms of an absolute value, a percentage or range relative to a full frame image. In some examples, the image target parameters can be analyzed additionally or alternatively with the environmental factor data to determine the region(s) of interest or reduced resolution portions of an image frame that can be downsampled.

For example, an image target parameter corresponding to image file size can be helpful to reduce stored data for each image as well as a total volume of image data being stored over time at a vehicle or other image capture application. For some image capture devices having improved resolutions, providing targeted solutions for limiting the high-resolution portions of an image (e.g., image portions within one or more regions of interest) can provide a solution for enhancing the resolution of important portions of an image while maintaining a manageable image file size for data processing and storage. In some examples, a target image file size can be less than 50% of a full image frame of a high performance vehicle camera. In some examples, a target image file size can be between about 15-50% of a full image frame of a high performance vehicle camera. In some examples, a target image file size can be between about 15-25% of a full image frame of a high performance vehicle camera.

In some specific examples, an actively shifting region of interest can be dynamically determined within a target field of view that has a smaller area than the full image frames of image capture data capable of being obtained by an image sensor. In some examples, the target field of view is established relative to one or more predefined target field of view definitions to limit the possible locations of the one or more regions of interest within a target field of view. In some examples, the target field of view definitions can include one or more of a height dimension or a height percentage corresponding to portion of the height dimension of a full image frame and/or a width dimension or a width percentage corresponding to a portion of the width dimension of a full image frame. In some examples, the target field of view definitions can include a width percentage of about 100% relative to the width of a full image frame. Full availability of an image in the width direction can be useful for some vehicle applications in which object detection is desired in wide angular ranges up to an entire 360 degree range around a vehicle. In some examples, the target field of view definitions can include a height percentage of between about 50% and about 75% relative to the height of a full image frame. A target field of view having a shorter height dimension than a full image frame can be useful in some vehicle applications because object detection is often less likely in upper portions of an image corresponding to sky and/or in lower portions of an image corresponding to ground surfaces nearest to a vehicle. By establishing target field of view definitions, an image capture device can determine regions of interest within targeted portions of a full frame image, thus reducing the file sizes of stored data by focusing on portions that are most relevant for specific applications (e.g., object detection).

Region of interest definitions can also be used to determine the one or more regions of interest within a full image frame or within a subset of the full image frame (e.g., within a target field of view). For instance, regions of interest can be established relative to one or more predefined region of interest definitions to limit the size and/or location of the one or more regions of interest. In some examples, the region of interest definitions can include one or more of a height dimension or a height percentage corresponding to a portion of the height dimension of a full image frame or a target field of view and/or a width dimension or a width percentage corresponding to a portion of the width dimension of a full image frame or a target field of view.

In some examples, the region of interest definitions can include a width percentage of about 100% of a full image frame and a height percentage of between about 5% and about 25% of a full image frame. In other examples, the region of interest definition can include a height percentage of between about 5% and about 75%. Similar to target field of view definitions, full availability of an image in the width direction can be useful for some vehicle applications in which object detection is desired in wide angular ranges up to an entire 360 degree range around a vehicle. Regions of interest having a shorter height dimension than a full image frame can be useful in some vehicle applications because object detection is often less likely in upper portions of an image corresponding to sky and/or in lower portions of an image corresponding to ground surfaces nearest to a vehicle. The particular height percentage value for a region of interest can sometimes be dependent on the geography within which a vehicle camera is operating. Having a slightly greater height percentage range can potentially be more useful for camera operation in geographically diverse areas where the regions of interest can be dependent on varied terrain and angular perspectives of a camera relative to a vehicle. By establishing region of interest definitions, an image capture device can determine regions of interest within targeted portions of a full frame image, thus reducing the file sizes of stored data by focusing on portions that are most relevant for specific applications (e.g., object detection).

In some examples, the digital images can be provided as output data routed to one or more processing devices in a vehicle control system. The digital images can be analyzed by the vehicle control system to identify at least one object in the digital image. In some examples, image objects of interest can include people, vehicles, roads, and/or navigation objects (e.g., street signs, traffic signals, etc.) An operational parameter of a vehicle (e.g., speed, direction, etc.) can be controlled in response to identification of at least one object in the digital image. In this manner, a vehicle can turn and/or stop upon conditions being detected within the digital images, including but not limited to the approach of another vehicle, a pedestrian crossing the road, a red traffic light being detected at an intersection, and the like.

In some examples, a vehicle control system configured to analyze digital image outputs from a disclosed image capture device can be provided as an integrated component in an autonomous vehicle. The autonomous vehicle can be configured to operate in one or more modes, for example, a fully autonomous operational mode, a semi-autonomous operational mode, a park mode, sleep mode, etc. A fully autonomous (e.g., self-driving) operational mode can be one in which the autonomous vehicle can provide driving and navigational operation with minimal and/or no interaction from a human driver present in the vehicle. A semi-autonomous (e.g., driver-assisted) operational mode can be one in which the autonomous vehicle operates with some interaction from a human driver present in the vehicle. Park and/or sleep modes can be used between operational modes while an autonomous vehicle waits to provide a subsequent service or recharges between operational modes.

The systems and methods described herein may provide a number of technical effects and benefits. For instance, image capture devices employing region of interest determination techniques as described herein are characterized by enhanced image quality. Enhanced image quality can be achieved by using high performance cameras equipped with onboard FPGAs to retain raw image capture data at or near a highest available resolution within regions of interest that are most important to specialized applications.

Image quality improvements can be particularly advantageous for image capture devices used in conjunction with vehicle control systems for autonomous vehicles. Because image capture devices for an autonomous vehicle repeatedly capture and analyze images of moving objects including other vehicles, pedestrians, changing traffic signs, and the like, improved image quality can advantageously lead to faster and more accurate object detection within generated digital images. Quicker and better object detection can have a direct effect on the provision of safer and smoother automated control of vehicle systems and improved overall performance of autonomous vehicles.

The systems and methods described herein may also provide a technical effect and benefit of enhancing the computing bandwidth of image processors and/or vehicle computing systems. Computing bandwidth can be enhanced by utilizing actively shifting regions of interest within image frames that are dynamically determined in a custom fashion based on environmental factors characterizing the operational environment of an image capture device and associated vehicle. Inclusion of a field-programmable gate array (FPGA) directly adjacent to the image sensors in order to dynamically control one or more actively-shifting regions of interest within image frames can maximize available pixel data for analysis while minimizing overall file size. By retaining raw image capture data within the determined region(s) of interest and downsampling raw image capture data outside the region(s) of interest, an image capture device can generate digital image outputs having focused fields of view that are most relevant to a particular application. The corresponding file size of the digital image outputs can be significantly reduced relative to a full resolution and full frame image. By reducing file size, the operating speed and computational bandwidth of image processors can be improved and potential latency within an image processing system can be reduced. Similarly, vehicle control systems that use digital images created as an output of the disclosed image capture devices can have improved operational speed, more accurate detection of stationary or moving objects within the digital images, and more seamless and efficient vehicle control.

With reference now to the FIGS., example embodiments of the present disclosure will be discussed in further detail. FIG. 1 depicts an example image capture device 100 according to example embodiments of the present disclosure. Image capture device 100 can include a shutter 102, one or more lenses 104, one or more filter(s) 106, an image sensor 108 and one or more image processors 110. Image capture device 100 can also have additional conventional camera components not illustrated in FIG. 1 as would be understood by one of ordinary skill in the art.

With more particular reference to FIG. 1, shutter 102 can be selectively controlled between open and closed positions. When shutter 102 is controlled to an open position, incoming light 112 passes through lens 104 and optional image filters 106 before reaching image sensor 108. Lens 104 can be positioned before, between and/or after the shutter 102 to focus images captured by image capture device 100. In some examples, lens 104 can be configured to sharpen the focus of images within a target field of view corresponding to a subset of an area of a full image frame capable of being detected by image sensor 108. The one or more filters 106 can be positioned before, between and/or after the shutter 102 to filter incoming light 112 provided to image capture device 100. Filter(s) 106 can include, for example, an infrared (IR) filter, a neutral density (ND) filter, an ultraviolet (UV) filter, a color filter array, or other filter type. Various operational parameters of shutter 102 can be controlled in accordance with an image capture device 100 as disclosed herein, including but not limited to an exposure time (e.g., shutter speed) and an exposure protocol. In some examples, image sensor 108 can obtain raw image capture data 114 in accordance with a global shutter exposure protocol by which shutter 102 is controlled to expose an entire surface of image sensor 108 to incoming light 112 at substantially the same time. In some examples, image sensor 108 can obtain raw image capture data 114 in accordance with a rolling shutter exposure protocol by which shutter 102 is controlled to expose different parts of the image sensor at different increments of time, for example, by quickly scanning across different portions of the image sensor in vertical and/or horizontal directions.

In some examples, the image sensor 108 can be a charge-coupled device (CCD) sensor or a complementary metal-oxide-semiconductor (CMOS) sensor, although other image sensors can also be employed. Image sensor 108 can include an array of image sensor elements corresponding to unique image pixels that are configured to detect incoming light 112 provided incident to a surface of image sensor 108. Each image sensor element within image sensor 108 can detect incoming light 112 by detecting the amount of light that falls thereon and converting the received amount of light into a corresponding electric signal. The more light detected at each pixel, the stronger the electric signal generated by the sensor element corresponding to that pixel. In some examples, each image sensor element within image sensor 108 can include a photodiode and an amplifier along with additional integrated circuit components configured to generate the electric signal representative of an amount of captured light at each image sensor element.

Figures 2, 3:
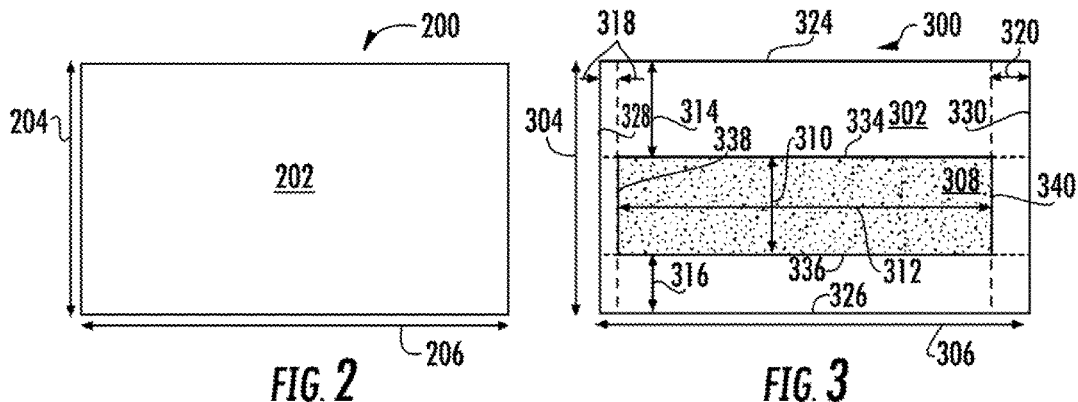
FIG. 2 depicts a first example digital image output based on a full frame and full resolution implementation according to example embodiments of the present disclosure.
FIG. 3 depicts a second example digital image output having a higher resolution portion within a region of interest and a lower resolution portion outside a region of interest according to example embodiments of the present disclosure.

The electric signals detected at image sensor 108 provide raw image capture data 114 at a plurality of pixels, each pixel corresponding to a corresponding image sensor element within image sensor 108. Image sensor 108 can be configured to capture successive full image frames 115 of raw image capture data 114 in successive increments of time. Each full image frame 115 can be characterized by an area 202 defined by height 204 and width 206, as represented in FIG. 2. Full image frames 115 of raw image capture data 114 also can be characterized by a first resolution. In some examples, the first resolution can be referred to as the full frame or full resolution capability of image capture device 100 since it corresponds with operation of image sensor 108 for maximum possible image quality and resolution. In some examples, the first resolution of raw image capture data can be measured based on a quantity such as pixels per unit, pixels per degree, angular resolution, spatial resolution, and/or instantaneous field of view (IFOV) measured in terms of radians (rad) or milliradians (mrad). The higher the resolution and size of full image frames 115, the greater the potential benefits are of determining target fields of view and regions of interest to decrease total volume of image file sizes that are saved and analyzed.

Referring still to FIG. 1, image capture device 100 also can include one or more image processing devices (e.g., image processors) 110 coupled to image sensor 108. In some examples, image processor 110 can be a field-programmable gate array (FPGA) provided within the image capture device 100. One or more image data links 116 can be provided to couple the one or more image processors 110 to image sensor 108. In some examples, each image data link 116 can be high speed data link that can relay relatively large amounts of image data while consuming a relatively low amount of power. In some examples, image data link(s) 116 can operate using different signaling protocols, including but not limited to a Low-Voltage Differential Signaling (LVDS) protocol, a lower voltage sub-LVDS protocol, a Camera Serial Interface (CSI) protocol using D-PHY and/or M-PHY physical layers, or other suitable protocols and interface layers.

The image processor(s) 110 can receive the raw image capture data 114 at the first resolution, downsample the raw image capture data 114 in one or more reduced resolution image portions, and generate a digital image output 117. In some examples, downsampling raw image capture data 114 can correspond to retrieving raw image capture data at only a subset of available pixels. Successive iterations of digital image output 117 can be created using raw image capture data 114 detected by image sensor 108 at different increments of times. The digital image output 117 can then be provided as output data for one or more subsequent applications. For example, digital image output 117 can be provided as output data routed to one or more processing devices in a vehicle control system, such as described in more detail in FIG. 6.

Digital image output 117 can be characterized as having a second resolution inside one or more regions of interest 118 and a third resolution in one or more image areas 119 that are outside the one or more regions of interest 118. In some examples, the image area(s) 119 outside the region(s) of interest 118 can correspond to reduced resolution image portions that are obtained by downsampling image capture data 114 obtained in those image area(s) 119. In some examples, the image area inside the region(s) of interest 118 having a second resolution is such that the second resolution corresponds to the first resolution, e.g., the same full frame/full resolution capability of the image sensor 108 within that portion of the image. In such examples, the raw image capture data 114 obtained by the image sensor 108 within the region(s) of interest 118 can be retained without downsampling.

Referring still to FIG. 1, the one or more image processor(s) 110 within the image capture device 100 can help determine the one or more regions of interest 118 in a dynamic fashion based on real time environmental factor data 120 provided as input to image processor 110. In some examples, the environmental factor data 120 can include terrain data 122 that provides elevation values for terrain associated with the current geographic location of a vehicle. In some examples, the environmental factor data 120 can include sensed object data 124 that provides location data for one or more sensed objects around a vehicle. In some examples, the environmental factor data 120 can include orientation data 126 that indicates an orientation of the image capture device 100 as positioned relative to a vehicle.

In some examples, the region(s) of interest 118 can actively shift across an entire image frame 115 as determined from the environmental factor data 120. In other examples, the region(s) of interest 118 can be determined within constraints established by one or more image target parameters 128. In some examples, image target parameters 128 can include one or more target field of view definitions that can determine certain dimensions and/or boundary limitations relative to a full image frame 115 within which the one or more regions of interest 118 can be determined. Other example image target parameters 128 can include image file size, resolution, dimension (e.g., length, width or height), area, center point, or the like. The image target parameters 128 can be defined in terms of an absolute value, a percentage or range relative to a full frame image. In some examples, the image target parameters 128 can be analyzed additionally or alternatively with the environmental factor data 120 to determine the region(s) of interest 118 or reduced resolution portions 119 of an image frame that can be downsampled.

Figure 4:
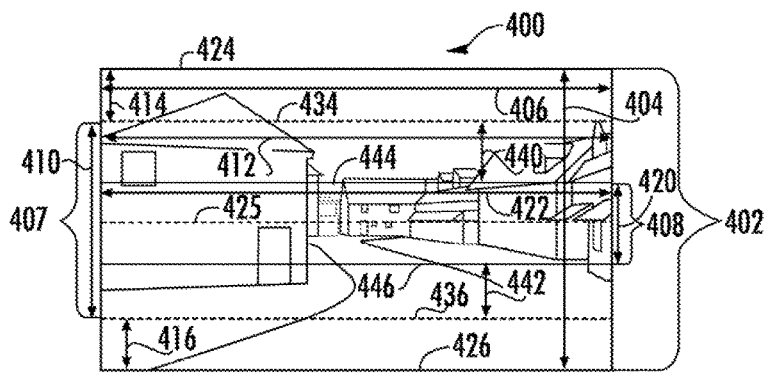
FIG. 4 depicts a third example digital image output having a higher resolution portion within a region of interest determined within a target field of view according to example embodiments of the present disclosure.

FIGS. 2-4 depict various example aspects of digital image outputs that can be determined and generated according to example aspects of the present disclosure. In general, FIG. 2 depicts a digital image output 200 generated with a first resolution across an entire full frame of image capture data 114 obtained by image sensor 108. FIG. 3 depicts a digital image output 300 having a second resolution portion within a region of interest and a third resolution portion outside a region of interest. FIG. 4 depicts a digital image output 400 having a second resolution portion within a region of interest that is determined within a target field of view.

Referring more particularly to FIG. 2, digital image output 200 depicts an area 202 that can be generated from a full image frame 115 of raw image capture data 114. Area 202 of digital image output 200 can be defined by height 204 and width 206, respectively. In some examples, area 200 can correspond to the maximum possible image size of image sensor 108 when operating with a maximum possible image quality and resolution (e.g., a first resolution). As such, digital image output 200 can be generated from raw image capture data 114 obtained by the image sensor 108 across the entire surface of the image sensor 108 without downsampling. In some examples, the first resolution of digital image output 200 is on the order of around nine (9) Megapixels or more.

Referring more particularly to FIG. 3, a digital image output 300 depicts an area 302 corresponding to a full image frame 115 of raw image capture data 114. In some examples, area 302 can correspond to area 202 from FIG. 2 in that full image frame height dimension 304 is substantially equivalent to full image frame height dimension 204 and full image frame width dimension 306 is substantially equivalent to full image frame width dimension 206. One or more regions of interest 308 are determined within area 302. The area defined by region of interest 308 has a smaller area than that of area 302 corresponding to a full image frame 115. Each region of interest 308 can be defined by a region of interest height dimension 310 and a region of interest width dimension 312. In some examples, region of interest height dimension 310 is less than full image frame height dimension 304. In some examples, region of interest width dimension 312 is less than full image frame width dimension 306. In some examples, only the region of interest height dimension 310 is less than the full image frame height dimension 304, while the region of interest width dimension 312 is substantially the same as the full image frame width dimension 306. The size of region of interest 308 defined by region of interest height dimension 310 and region of interest width dimension 312 can be dynamically determined within area 302 based at least in part on the one or more portions of environmental factor data 120.

The relative location of each region of interest 308 within area 302 can be defined relative to a top spacing 314, a bottom spacing 316, a left spacing 318 and a right spacing 320. Top spacing 314 corresponds to a distance between a top edge 324 of area 302 and a top edge 334 of region of interest 308. Bottom spacing 316 corresponds to a distance between a bottom edge 326 of area 302 and a bottom edge 336 of region of interest 308. Left spacing 318 corresponds to a distance between a left edge 328 of area 302 and a left edge 338 of region of interest 308. Right spacing 320 corresponds to a distance between a right edge 330 of area 302 and a right edge 340 of region of interest 308. The relative location of region of interest 308 within area 302 in terms of upper spacing 314, lower spacing 316, left spacing 318 and right spacing 320 can by dynamically determined by the one or more portions of environmental factor data 120.

Digital image output 300 can have different image portions having different resolutions. For example digital image output 300 can have a different resolution inside region of interest 308 than the resolution of area 302 falling outside region of interest 308. In some examples, the one or more regions of interest 308 can be characterized by a second resolution, and the area 302 falling outside region of interest 308 can be characterized by a third resolution. In some examples, the second resolution and third resolution can be measured based on a quantity such as pixels per unit, pixels per degree, angular resolution, spatial resolution, and/or instantaneous field of view (IFOV) measured in terms of radians (rad) or milliradians (mrad). In some examples, the third resolution of area 302 falling outside region of interest 308 can be less than the second resolution of region of interest 308. In some examples, the third resolution outside the one or more regions of interest 308 is at least about fifty percent (50%) less than the first and second resolutions. In some examples, the third resolution outside the one or more regions of interest is at least about twenty-five percent (25%) less than the first and second resolutions. In some examples, the second resolution of region of interest 308 is the same as the first resolution corresponding to the full resolution capability of image sensor 108, although the second resolution of region of interest 308 can be less than the first resolution in other examples. By determining a region of interest 308 in digital image output 300 as having a higher resolution, and reducing resolution outside the region of interest 308, digital image output 300 can provide a focused field of view on relevant image portions for specific applications while reducing file size and computational bandwidth for subsequent image processing.

Referring more particularly to FIG. 4, a digital image output 400 depicts an area 402 corresponding to a full image frame 115 of raw image capture data 114. In some examples, area 402 can correspond to area 202 from FIG. 2 in that height dimension 404 is substantially equivalent to height dimension 204 and width dimension 406 is substantially equivalent to width dimension 206.

Digital image output 400 can include one or more target fields of view 407 that are determined within area 402. In some examples, target field of view 407 can have a size and relative location within area 402 that is predetermined in accordance with one or more image target parameters 128 (e.g., target field of view definitions). A target field of view 407 can have a smaller area than area 402 corresponding to a full image frame 115 of image capture data 114. Target field of view size can be defined by a target field of view height dimension 410 and a target field of view width dimension 412. In some examples, target field of view height dimension 410 is less than full image frame height dimension 404. In some examples, target field of view width dimension 412 is less than full image frame width dimension 406. In some examples, as depicted in FIG. 4, only the target field of view height dimension 410 is less than the full image frame height dimension 404, while the target field of view width dimension 412 is substantially the same as the full image frame width dimension 406.

The relative location of target field of view 407 within area 402 can be defined relative to a top spacing, bottom spacing, left spacing and right spacing similar to that described in FIG. 3 for each region of interest 308. In FIG. 4, target field of view 407 spans the entire width dimension of area 402 and thus has left spacing and right spacing values of zero (0). A top spacing 414 corresponds to a distance between a top edge 424 of area 402 and a top edge 434 of target field of view 407. Bottom spacing 416 corresponds to a distance between a bottom edge 426 of area 402 and a bottom edge 436 of target field of view 407. In some examples, the relative location of target field of view 407 within area 402 can be defined relative to vertical and/or horizontal center points or center lines. For instance, FIG. 4 depicts a vertical center line 425 that can be used to help establish a predetermined relative location of target field of view 407 within area 402.

Digital image output 400 can further include one or more regions of interest 408 that are dynamically determined within one or more target fields of view 407. As such, the size and relative location of region of interest 408 can actively shift based at least in part on one or more portions of environmental factor data 120. The possible range of sizes and relative locations for region of interest 408 can be determined from the size and relative location of target field of view 407 as opposed to that of area 402. As such, a region of interest 408 can have a smaller area than area 402 as well as a smaller area than target field of view 407.

Each region of interest 408 can be defined by a region of interest height dimension 420 and a region of interest width dimension 422. In some examples, region of interest height dimension 420 is less than target field of view height dimension 410. In some examples, region of interest width dimension 422 is less than target field of view width dimension 412. In some examples, only the region of interest height dimension 420 is less than the target field of view height dimension 410, while the region of interest width dimension 422 is substantially the same as the target field of view width dimension 412.

The relative location of region of interest 408 within target field of view 407 can be defined relative to a top spacing, bottom spacing, left spacing and right spacing similar to that described in FIG. 3 for each region of interest 308. In FIG. 4, region of interest 408 spans the entire width dimension of target field of view 407 and thus has left spacing and right spacing values of zero (0). A top spacing 440 corresponds to a distance between a top edge 434 of target field of view 407 and a top edge 444 of region of interest 408. Bottom spacing 442 corresponds to a distance between a bottom edge 436 of target field of view 407 and a bottom edge 446 of region of interest 408.

Digital image output 400 can have different image portions having different resolutions. For example digital image output 400 can have a different resolution inside region of interest 408 than the resolution of area 402 falling outside region of interest 408. In some examples, the one or more regions of interest 408 can be characterized by a second resolution, and the area 402 falling outside region of interest 408 can be characterized by a third resolution. In some examples, the third resolution of area 402 falling outside region of interest 408 can be less than the second resolution of region of interest 408. In some examples, the second resolution of region of interest 408 is the same as the first resolution corresponding to the full resolution capability of image sensor 108, although the second resolution of region of interest 408 can be less than the first resolution in other examples. By determining a region of interest 408 in digital image output 400 as having a higher resolution, and reducing resolution outside the region of interest 408, digital image output 400 can provide a focused field of view on relevant image portions for specific applications while reducing file size and computational bandwidth for subsequent image processing.

In some examples, specific ranges of values for the size and relative location of region of interest 308 of FIG. 3 and/or target field of view 407 and/or region of interest 408 of FIG. 4 can be useful for specific applications (e.g., object detection in vehicle applications). In such cases, full availability of an image in the width direction can be useful because objects including vehicles, pedestrians, roads, buildings, terrain, etc. can be potentially positioned any-where within a 360 degree panoramic perspective around a vehicle. Full availability of an image width can be achieved, for example, by limiting the size of left spacing 318 and right spacing 320 of region of interest 308 within area 302 of FIG. 3. In some examples, a left spacing and right spacing can be set to zero (0), such as illustrated for target field of view 407 and region of interest 408 of FIG. 4.

In some examples, region of interest height dimension 310 of region of interest 308 and/or target field of view height dimension 410 of target field of view 407 can be limited in accordance with one or more predetermined definitions. For instance, region of interest height dimension 310 can be characterized by an upper limit corresponding to a percentage portion of full image frame height dimension 304. In some examples, region of interest height dimension 310 can be characterized by an upper limit corresponding to a height percentage of between about 50% and about 75% relative to full image frame height 304, meaning that region of interest height dimension 310 divided by full image frame height dimension 304 times one hundred (100) can fall within a range of between about fifty (50) and seventy-five (75).

Similarly, target field of view height dimension 410 can be defined in accordance with a target field of view definition to be set at a predetermined percentage portion of full image frame height dimension 404. In some examples, target field of view height dimension 410 can be characterized by a height percentage of between about 50% and about 75% relative to full image frame height dimension 404, meaning that target field of view height dimension 410 divided by full image frame height dimension 404 times one hundred (100) can fall within a range of between about fifty (50) and seventy-five (75). In some examples, region of interest height dimension 420 can be characterized by a height percentage of between about 5% and about 75% relative to full image frame height dimension 404, meaning that region of interest height dimension 420 divided by full image frame height dimension 404 times one hundred (100) can fall within a range of between about five (5) and seventy-five (75). In some examples, region of interest height dimension 420 can be characterized by a height percentage of between about 5% and about 25% relative to full image frame height dimension 404, meaning that region of interest height dimension 420 divided by full image frame height dimension 404 times one hundred (100) can fall within a range of between about five (5) and twenty-five (25). In some examples, region of interest height dimension 420 can be characterized by a height percentage of between about 10% and about 20% relative to full image frame height dimension 404, meaning that region of interest height dimension 420 divided by full image frame height dimension 404 times one hundred (100) can fall within a range of between about ten (10) and twenty (20.) Other specific ranges of values for a height percentage of region of interest 408 within full image frame 402 and/or within target field of view 407 can be employed in accordance with the disclosed embodiments.

A region of interest 308 and/or target field of view 407 having a shorter height dimension than a full image frame 302/402 can be useful in some vehicle applications because object detection is often less likely in upper portions of an image corresponding to sky and/or in lower portions of an image corresponding to ground surfaces nearest to a vehicle. By establishing a dimensional limit (e.g., a height percentage) for region of interest 308 and/or target field of view 407, an image capture device can determine regions of interest within targeted portions of a full frame image, thus reducing the file sizes of stored data by focusing on portions that are most relevant for specific applications (e.g., object detection). Further focusing region of interest 408 within target field of view 407 by determining a size and relative location of region of interest 408 based at least in part from one or more portions of environmental factor data 120 can provide still further advantages by targeting region of interest 408 to capture image data in predetermined areas that are most likely to include objects for which detection is desired. In some examples, the size and relative location of region of interest 408 can be dependent on the geography within which a vehicle camera is operating. Having a slightly greater height percentage or other dimensional limit can potentially be more useful for camera operation in geographically diverse areas where the regions of interest can be dependent on varied terrain and angular perspectives of a camera relative to a vehicle.

In some examples, specific ranges of values for the image file size of digital image outputs 300/400 and/or values for the second resolution within regions of interest 308/408 and/or values for the third resolution in areas 302/402 outside regions of interest 308/408 can be useful for specific applications (e.g., object detection in vehicle applications). Providing targeted solutions for limiting the high-resolution portions of an image (e.g., image portions within one or more regions of interest) can provide a solution for enhancing the resolution of important portions of an image while maintaining a manageable image file size for data processing and storage. In such cases, having a second resolution within a region of interest corresponding to the first resolution (e.g., the full resolution capability of image sensor 108) can be useful in order to enhance image clarity in portions of an image that are determined to be most relevant for locating objects including vehicles, pedestrians, roads, buildings, signage, terrain, etc. By downsampling image portions outside the regions of interest 308/408 to a third resolution less than the second resolution, a total file size of digital image outputs 300/400 can be significantly reduced for each image as well as a total volume of image data being stored over time at a vehicle or other image capture application. In some examples, the third resolution is less than 50% of the second resolution and/or less than about 50% of the first resolution. In some examples, the third resolution is between about 15-50% of the second resolution and/or between about 15-50% of the first resolution. In some examples, the third resolution is between about 15-25% of the second resolution and/or between about 15-25% of the first resolution. In some examples, a target image file size for digital image output 300/400 can be less than about 50% of a digital image output 200 generated at full resolution across a full image frame. In some examples, a target image file size for digital image output 300/400 can be between about 15-50% of a digital image 200 generated at full resolution across a full image frame. In some examples, a target image file size for digital image output 300/400 can be between about 15-25% of a digital image 200 generated at full resolution across a full image frame.

Figure 5:
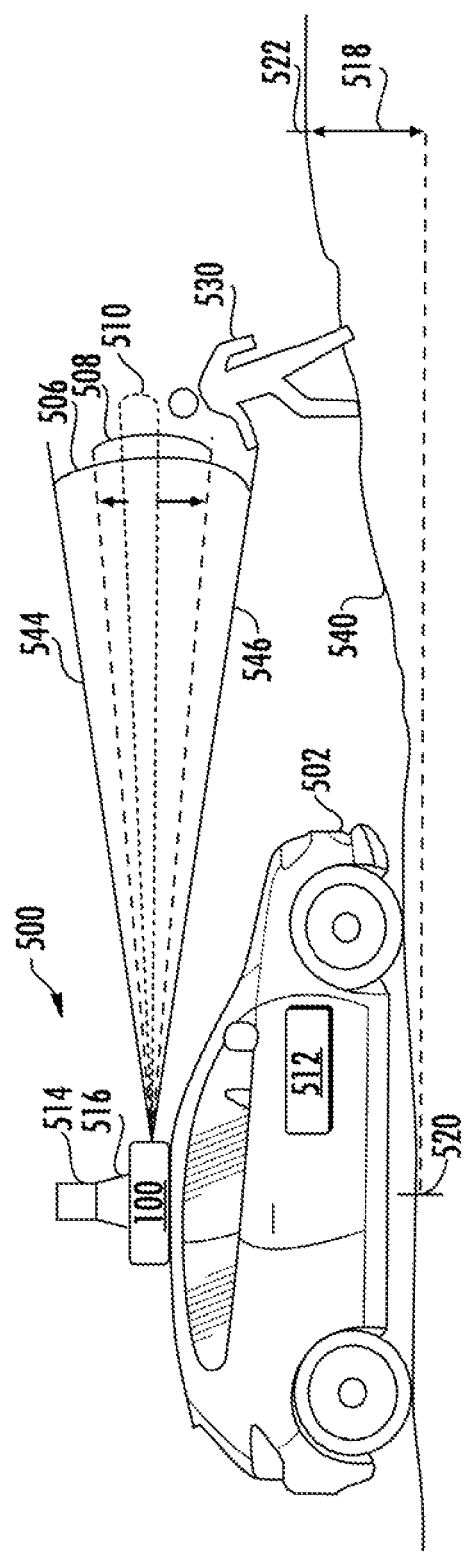
FIG. 5 depicts an example system of obtaining images and determining regions of interest according to example embodiments of the present disclosure.

Referring now to FIG. 5, an example system 500 can include features for obtaining images and determining regions of interest according to example embodiments of the present disclosure. System 500 can include a vehicle 502 and an image capture device 100. Image capture device 100 can be configured to capture images within a full field of view 506, corresponding to images having full frame and full resolution, such as depicted by full frame images 115 of FIG. 1 or digital image output 200 of FIG. 2. Target field of view definitions can be determined based at least in part from one or more image target parameters 128 for limiting a target field of view 508 within which a region of interest 510 can be dynamically determined. Region of interest 510 can be determined within target field of view 508 based at least in part on one or more portions of environmental factor data 120 determined including real time data indicative of one or more environmental factors defining the operational environment of the image capture device 100 as positioned relative to vehicle 502. Although region of interest 510 is described in FIG. 5 as being determined relative to target field of view 508, it should be appreciated that other examples can determine region of interest 510 relative to full field of view 506.

In some examples, real-time environmental factor data 120 can include, for example, terrain data including elevation values associated with a vehicle's current geographic location as obtained from a mapping system 512 provided at vehicle 502. Vehicle 502 can include a mapping system 512 including one or more location sensors for determining actual and/or relative position of vehicle 502 by using a satellite navigation positioning system (e.g. a GPS system, a Galileo positioning system, the Global Navigation Satellite System (GNSS), the BeiDou Satellite Navigation and Positioning system), an inertial navigation system, a dead reckoning system, based on IP address, by using triangulation and/or proximity to cellular towers or WiFi hotspots, beacons, and the like and/or other suitable techniques for determining position relative to a known geographic reference such as a navigational map of a given area. Because location sensors within mapping system 512 can determine where vehicle 502 is relative to geographic references, mapping system 512 can also determine terrain data 122 associated with the current geographic location of vehicle 502. Terrain data 122 can include elevation information (e.g., an altitude value) associated with a location (e.g., latitude and longitude coordinate values) as determined from an elevation database providing three-dimensional model values corresponding to different locations across the earth's surface.

When mapping system 512 provides mapping data that includes terrain data 122, a vehicle can use the terrain data 122 to determine the one or more regions of interest 510 within target field of view 508 and/or within full field of view 506. For example, if vehicle 502 is approaching a hill, mapping system 512 can determine an elevation difference 518 from a current geographic location 520 of vehicle 502 to a planned or predicted next geographic location 522 of vehicle 502. A relative location of region of interest 510 within target field of view 508 and/or within full image frame 506 can be shifted upwards to capture objects positioned relative to the next geographic location 522 having a higher elevation than the current geographic location 520. Elevation differences 518 between a current geographic location 520 and a next geographic location 522 can be tracked in real time by mapping system 512 and translated by image capture device 100 to actively shifting locations for region of interest 510 within target field of view 508.

In some examples, real-time environmental factor data can include, for example, sensed object data identifying the location of sensed objects near the vehicle 502. In some examples, vehicle 502 can include one or more sensors 514 for determining one or more sensed objects near the vehicle 502. In some examples, sensor(s) 514 can include image capture device 100 such that images obtained by image capture device are used at least in part to detect sensed objects indicated in the sensed object data. In some examples, additional sensors are included, such as but not limited to image sensors, light detection and ranging (or radar) device(s) (LIDAR systems), two-dimensional image capture devices, three-dimensional image capture devices, static image capture devices, dynamic (e.g., rotating, revolving) image capture devices, video capture devices (e.g., video recorders), lane detectors, scanners, optical readers, electric eyes, and/or other suitable types of image capture devices, motion sensors, pressure sensors, temperature sensors, humidity sensors, RADAR, sonar, radios, medium-range and long-range sensors (e.g., for obtaining information associated with the vehicle's surroundings), global positioning system (GPS) equipment, proximity sensors, and/or any other types of sensors for obtaining data associated with object detection relative to vehicle 502. Example sensed objects that can be determined from sensed object data provided by the one or more sensors 514 can include one or more of a person (e.g., a pedestrian), an animal, a vehicle, a bicycle, a road, a road feature, a navigational object such as signage, a building, an object, road conditions (e.g., curves, potholes, dips, bumps, changes in grade), distances between vehicle 502 and other vehicles and/or objects, etc.

When one or more sensed objects are detected relative to vehicle 502, the position at which such sensed object(s) are detected can be used to determine the one or more regions of interest 510 within target field of view 508 and/or within full field of view 506. For example, if a pedestrian 530 is detected within full field of view 506 at a particular location, the one or more regions of interest 510 can be actively shifted to include the location of the detected pedestrian 530 at a current time and future relevant increments of time (e.g., times when the pedestrian 530 is determined to have a trajectory moving towards vehicle 520 as opposed to away from vehicle 520) as the current geographic location of the vehicle changes.

In some examples, vehicle 502 can include one or more orientation sensors 516 for determining orientation data 126 associated with image capture device 100. The orientation data 126 from orientation sensors 516 can indicate a position and/or orientation of image capture device 100 relative to vehicle 502 and/or a ground surface 540 below vehicle 502. Since the full field of view 506 can be determined in part from the position and orientation of image capture device 100, orientation data 126 can be used to help define the relative locations of an upper boundary 544 of full field of view 506 as well as a lower boundary 546 of full field of view 506. The relative locations of region of interest 510 can then be determined within full field of view 506 and/or within target field of view 508 based at least in part from the determined upper boundary 544 and lower boundary 546 of full field of view 506. It should be appreciated that orientation sensor(s) 516 can be useful on its own accord or to supplement terrain data 122 from mapping system 512 to detect relative changes in elevation of vehicle 502 as it traverses various terrain features. Orientation sensor(s) 516 can include a compass, an accelerometer, a proximity sensor, or any other sensor or device configured to directly or indirectly detect relative position and orientation.

Figure 6:
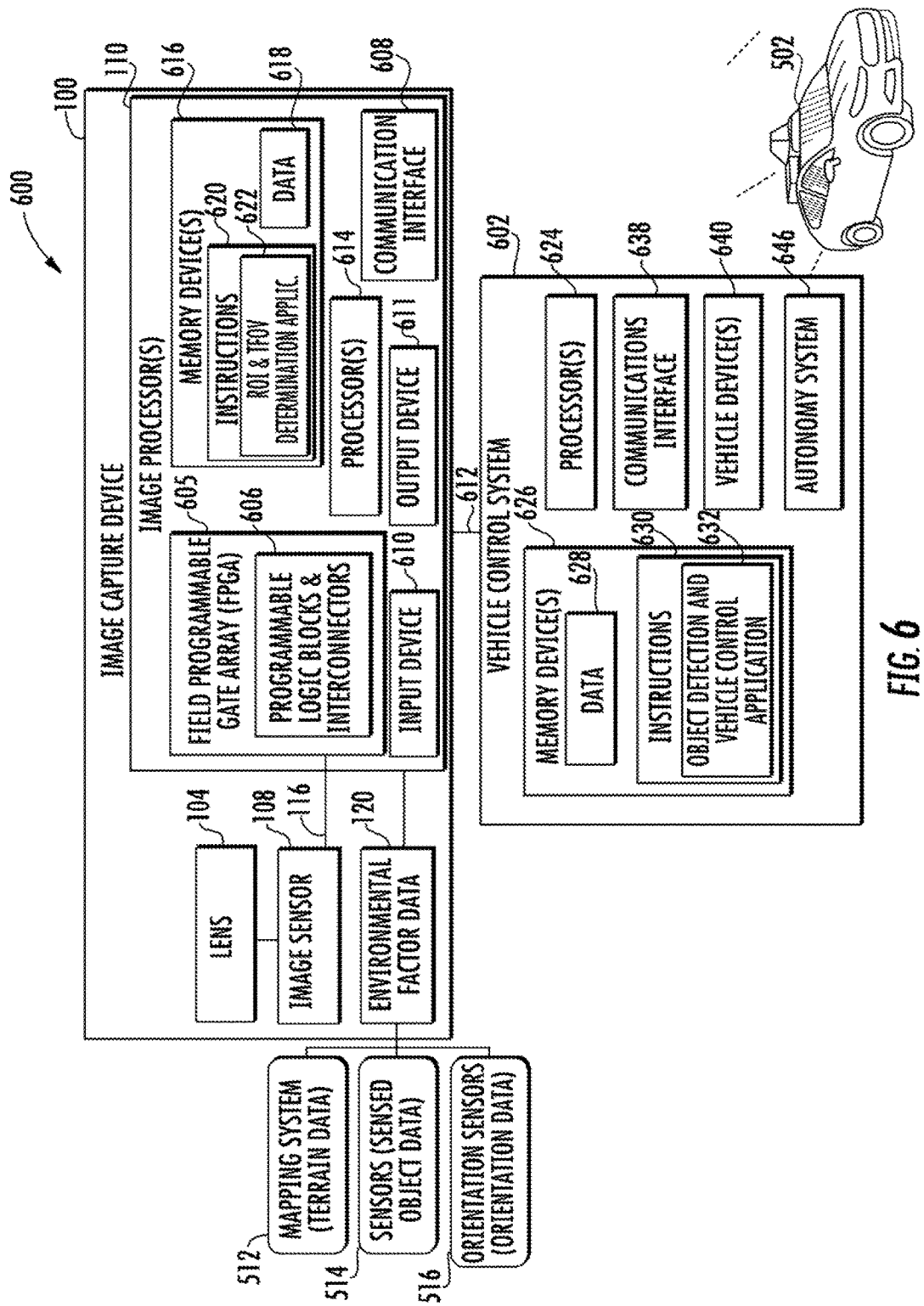
FIG. 6 depicts an example system of obtaining images in accordance with determined regions of interest and implementing vehicle control according to example embodiments of the present disclosure.

Referring now to FIG. 6, an example system 600 of obtaining images and implementing vehicle control according to example embodiments of the present disclosure can include an image capture device 100 and a vehicle control system 602, both of which may be located at and associated with a vehicle, such as vehicle 502 of FIG. 5. Some components of image capture device 100 are similar to those illustrated in FIG. 1, including lens 104, image sensor 108, and image processor 110.

In some examples, the one or more image processor(s) 110 can include a field-programmable gate array (FPGA) 605 directly onboard the image capture device 100. FPGA 605 can be positioned adjacent to the image sensor 108 in order to dynamically control the one or more actively-shifting regions of interest within image frames of raw image capture data obtained by image sensor 108. FPGA 605 can include a plurality of programmable logic blocks and interconnectors 606. Specific configurations of the plurality of programmable logic blocks and interconnectors 606 can be selectively controlled to process raw image capture data received from image sensor 108, for example, by downsampling the image capture data received from image sensor 108 outside one or more regions of interest. One or more image data link(s) 116 can couple image sensor 108 to FPGA 605. An image data link 116 can be a high speed data link that can relay relatively large amounts of image data while consuming a relatively low amount of power. In some examples, image data link(s) 116 can operate using different signaling protocols, including but not limited to a Low-Voltage Differential Signaling (LVDS) protocol, a lower voltage sub-LVDS protocol, a Camera Serial Interface (CSI) protocol using D-PHY and/or M-PHY physical layers, or other suitable protocols and interface layers.

Image processor 110 and vehicle control system 602 can respectively include one or more processor(s) 614, 624 along with one or more memory device(s) 616, 626 that can collectively function as respective computing devices. The one or more processor(s) 614, 624 can be any suitable processing device such as a microprocessor, microcontroller, integrated circuit, an application specific integrated circuit (ASIC), a digital signal processor (DSP), a field-programmable gate array (FPGA), logic device, one or more central processing units (CPUs), processing units performing other specialized calculations, etc. The processor(s) 614, 624 can be a single processor or a plurality of processors that are operatively and/or selectively connected.

The memory device(s) 616, 626 can include one or more non-transitory computer-readable storage media, such as RAM, ROM, EEPROM, EPROM, flash memory devices, magnetic disks, etc., and/or combinations thereof. The memory device(s) 616, 626 can store information that can be accessed by the one or more processor(s) 614, 624. For instance, the memory device(s) 616 can include computer-readable instructions 620 that can be executed by the one or more processor(s) 614. Similarly, memory device(s) 626 can include computer-readable instructions 630 that can be executed by the one or more processor(s) 624. The instructions 620, 630 can be software written in any suitable programming language, firmware implemented with various controllable logic devices, and/or can be implemented in hardware. Additionally, and/or alternatively, the instructions 620, 630 can be executed in logically and/or virtually separate threads on processor(s) 614, 624. The instructions 620, 630 can be any set of instructions that when executed by the one or more processor(s) 614, 624 cause the one or more processor(s) 614, 624 to perform operations.

For example, the memory device(s) 616 can store instructions 620 that when executed by the one or more processor(s) 614 cause the one or more processor(s) 614 to perform operations associated with a region of interest (ROI) and target field of view (TFOV) determination application 622. Region of interest and target field of view determination application 622 can be defined in terms of instructions for controlling interconnection of logic blocks 606 within FPGA 605 to retain raw image capture data from image sensor 108 in one or more determined regions of interest while downsampling raw image capture data from image sensor 108 outside one or more determined regions of interest. Region of interest and target field of view determination application 622 can also be defined in terms of instructions for determining the regions of interest from one or more portions of environmental factor data 120. Memory device(s) 626 can store instructions 630 that when executed by the one or more processor(s) 624 cause the one or more processor(s) 624 to perform operations associated with an object detection and vehicle control application 632. Object detection and vehicle control application 632 can be defined in terms of instructions for performing operations including identifying objects in digital image outputs, controlling operational parameters of a vehicle in response to identification of the detected objects within the digital image outputs, and/or any other operations or functions related to vehicle operation.

The one or more memory device(s) 616, 626 can store data 618, 628 that can be retrieved, manipulated, created, and/or stored by the one or more processor(s) 614, 624. The data 618 can include, for instance, raw image capture data 114, environmental factor data 120, digital image outputs 117, or other image-related data or parameters. Data 628 can include, for instance, digital image outputs from image capture device 100, data associated with a vehicle 502, environmental factor data 120, data acquired by vehicle sensors or other image capture devices, 2D and/or 3D map data associated with a past, current and/or future operating environment of vehicle 502 as obtained from one or more remote computing systems and/or local memory devices, data identifying the surrounding environment of a vehicle 502, and/or other data or information. The data 618, 628 can be stored in one or more database(s). The one or more database(s) can be split up so that they can be provided in multiple locations.

Image capture device 100 and vehicle control system 602 can respectively include a communication interface 608, 638 used to communicate with one another and one or more other component(s) of the system 600 or other systems of vehicle 502. The communication interface 608, 638 can include any suitable components for interfacing with one or more communication channels 612, including for example, transmitters, receivers, ports, controllers, antennas, or other suitable hardware and/or software. Communication channel 612 can be any type of communication channel, such one or more data bus(es) (e.g., controller area network (CAN)), an on-board diagnostics connector (e.g., OBD-II) and/or a combination of wired and/or wireless communication links for sending and/or receiving data, messages, signals, etc. among devices/systems. Communication channel 612 can additionally or alternatively include one or more networks, such as a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle image capture device 100 and/or vehicle control system 602 and/or other local vehicle systems or associated server-based processing or control systems located remotely from a vehicle 502. The communication channel 612 can include a direct connection between one or more components of the system 600. In general, communication using communication channel 612 and/or among one or more component(s) of the system 600 can be carried via communication interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

Image capture device 100 also can include one or more input devices 610 and/or one or more output devices 611. An input device 610 can include, for example, devices for receiving information from a user, such as a touch screen, touch pad, mouse, data entry keys, speakers, a microphone suitable for voice recognition, etc. An input device 610 can be used, for example, by a user to select controllable inputs for operation of the image capture device 100 (e.g., shutter, ISO, white balance, focus, exposure, etc.) and or control of one or more image target parameters 128. An output device 611 can be used, for example, to provide digital image outputs to a vehicle operator. For example, an output device 611 can include a display device (e.g., display screen, CRT, LCD), which can include hardware for displaying an image or other communication to a user. Additionally, and/or alternatively, an output device(s) can include an audio output device (e.g., speaker) and/or device for providing haptic feedback (e.g., vibration).

Vehicle control system 602 can include one or more controllable vehicle device(s) 640, such as but not limited to acceleration and/or deceleration/braking pedals, buttons or other control devices, steering wheels or other directional devices, and the like. Vehicle device(s) 640 can be selectively controlled based on digital image outputs generated by image capture device 100 and/or specific image processing conducted on the digital image outputs (e.g., detection of objects including but not limited to one or more of a person (e.g., a pedestrian), an animal, a vehicle, a bicycle, a road, a road feature, a navigational object such as signage, a building, an object, road conditions (e.g., curves, potholes, dips, bumps, changes in grade), distances between vehicle 502 and other vehicles and/or objects, etc.

A vehicle 502 incorporating vehicle control system 602 can be an automobile, an aircraft, and/or another type of vehicle. In some examples, a vehicle 502 incorporating vehicle control system 602 can be an autonomous vehicle that can drive, navigate, operate, etc. with minimal and/or no interaction from a human driver. An autonomous vehicle 502 can be configured to operate in one or more mode(s) such as, for example, a fully autonomous operational mode and/or a semi-autonomous operational mode. A fully autonomous (e.g., self-driving) operational mode can be one in which the autonomous vehicle can provide driving and navigational operation with minimal and/or no interaction from a human driver present in the vehicle. A semi-autonomous operational mode can be one in which the autonomous vehicle can operate with some interaction from a human driver present in the vehicle.

When image capture device 100 is provided as an integral component within an autonomous vehicle 502, image capture device 100 can be located in the interior and/or on the exterior of such a vehicle 502. The image capture device(s) 100 can be configured to acquire image data to allow the vehicle 502 to implement one or more machine vision techniques (e.g., to detect objects in the surrounding environment). Digital image outputs from image capture device 100 can be combined with environmental factor data including one or more of terrain data 122 from mapping system 512 that provides mapping data and/or elevation data about terrain associated with the current geographic location of a vehicle and nearby geographic locations, sensed object data 124 from one or more sensors 514 that provides location data for one or more sensed objects around a vehicle, and/or orientation data 126 from one or more orientation sensors 516 that provide orientation data indicating a position and/or orientation of image capture device 100 as positioned relative to a vehicle, and/or any other types of sensors for obtaining data associated with the vehicle 502 and/or relevant to the operation of the vehicle 502 (e.g., in an autonomous mode).

When vehicle 502 is an autonomous vehicle, vehicle control system 602 can include an autonomy system 646 configured to allow the vehicle 502 to operate in an autonomous mode (e.g., fully autonomous mode, semi-autonomous mode). For instance, the autonomy system 646 can obtain data associated with the vehicle 502 (e.g., acquired by the image capture device 100 as well as other vehicle sensor(s)). The autonomy system 646 can interface with processor(s) 624 and memory device(s) 626 to help control various functions of the vehicle 502 based, at least in part, on the data acquired by the image capture device 100 as well as other sensor(s) to implement an autonomous mode. For example, the autonomy system 646 can include various models to detect objects (e.g., people, animals, vehicles, bicycles, buildings, roads, road features, road conditions (e.g., curves, potholes, dips, bumps, changes in grade), navigational objects such as signage, distances between vehicle 502 and other vehicles and/or objects, etc.) based, at least in part, on the acquired image data, other sensed data and/or map data. In some implementations, the autonomy system 646 can include machine-learned models that use the digital image outputs acquired by the image capture device 100 or other data acquisition system(s) and/or the map data to help operate the vehicle 502. The autonomy system 646 can be configured to predict the position and/or movement (or lack thereof) of such objects (e.g., using one or more odometry techniques). The autonomy system 646 can be configured to plan the motion of the vehicle 502 based, at least in part, on such predictions. The autonomy system 646 can include a navigation system and can be configured to implement the planned motion to appropriately navigate the vehicle 502 with minimal and/or no human-driver intervention. For example, the autonomy system can regulate vehicle speed, acceleration, deceleration, steering, and/or the operation of components to follow the planned motion. In this way, the autonomy system 646 can allow an autonomous vehicle 502 to operate in a fully and/or semi-autonomous mode.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein can be implemented using a single server or multiple servers working in combination. Databases and applications can be implemented on a single system or distributed across multiple systems. Distributed components can operate sequentially or in parallel.

Figure 7:
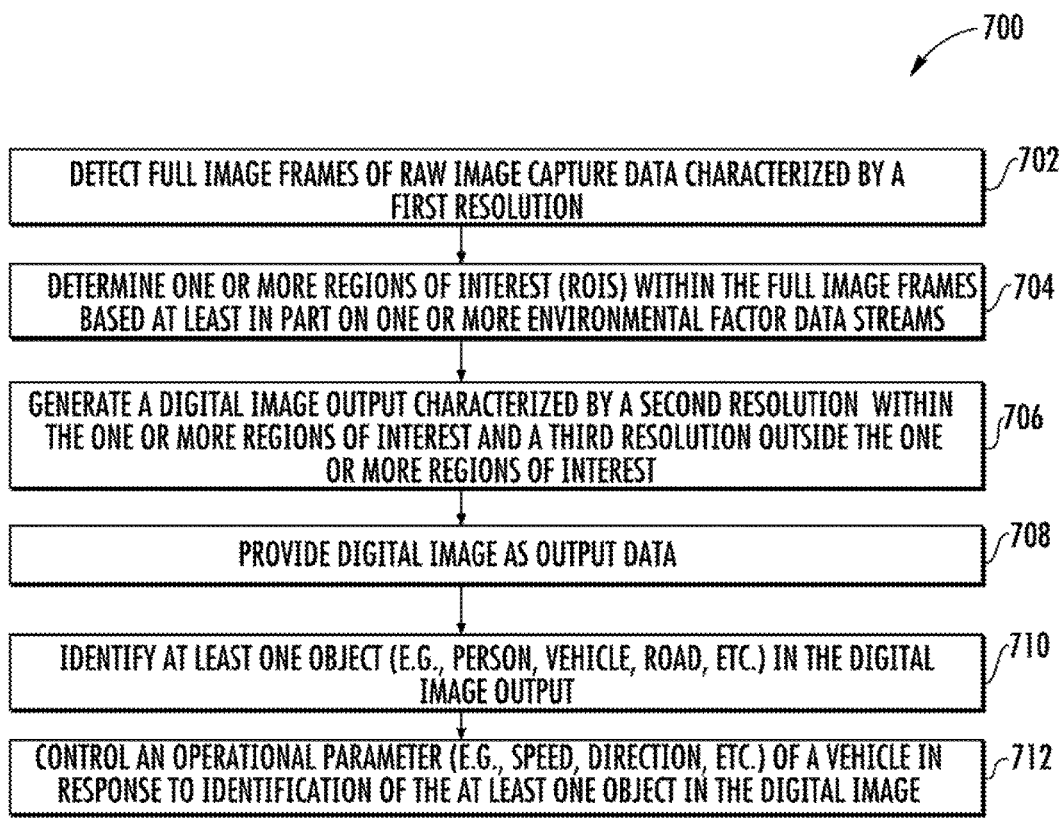
FIG. 7 depicts a flow diagram of an example method of obtaining images and implementing vehicle control according to example embodiments of the present disclosure.

FIG. 7 depicts a flow diagram of an example method 700 of obtaining images and implementing vehicle control according to example embodiments of the present disclosure. Full image frames 115 of raw image capture data 114 can be detected at (702) by one or more image sensors 108. The full frames of raw image capture data detected at (702) can be characterized by a first resolution corresponding to the maximum possible image size of image sensor 108 when operating with a maximum possible image quality and resolution (e.g., a first resolution). As such, raw image capture data 114 can be detected at (702) by an image sensor 108 across the entire surface of the image sensor 108 without downsampling. In some examples, the first resolution of raw image capture data detected at (702) is on the order of around nine (9) Megapixels or more.

At (704), method 700 can include determining one or more regions of interest within the full image frames of raw image capture data detected at (702). The one or more regions of interest can be determined at (704) using one or more processing devices, e.g., image processor 110 and/or processor(s) 604/624. In some examples, a region of interest can be determined at (704) within a full image frame as depicted in FIG. 3, or within a target field of view corresponding to a smaller area or subset of a full image frame as depicted in FIG. 4. Determining one or more regions of interest at (704) can include determining a size of each region of interest (e.g., one or more of a height dimension or a height percentage corresponding to a portion of the height dimension of a full image frame or a target field of view and/or a width dimension or a width percentage corresponding to a portion of the width dimension of a full image frame or a target field of view). Determining one or more regions of interest at (704) can also include determining a relative location of each region of interest within a full image frame or within a target field of view. In some examples, a relative location can be defined in terms of spacings from edges of a full image frame (e.g., top spacing 314, bottom spacing 316, left spacing 318, and/or right spacing 312 of FIG. 3) and/or spacings from edges of a target field of view (e.g., top spacing 440 and/or bottom spacing 442 of FIG. 4) and/or relative to one or more center points or center lines, such as center line 425 of FIG. 4. The one or more regions of interest determined at (704) can be based at least in part on one or more portions of environmental factor data including real time data indicative of one or more environmental factors defining the operational environment of the image capture device as positioned relative to a vehicle, such as environmental factor data described with more particular reference to FIGS. 1 and 5. More particular details regarding determining regions of interest at (704) based on environmental factor data and/or other parameters are presented with reference to FIG. 8.

At (706), method 700 can also include generating a digital image output characterized by a second resolution within the one or more regions of interest determined at (704) and a third resolution outside the one or more regions of interest determined at (704). In some examples, generating a digital image output at (706) can correspond to generating a digital image output 117 as depicted in FIG. 1, a digital image output 300 as depicted in FIG. 3 and/or a digital image output 400 as depicted in FIG. 4. In some examples, the second resolution within the one or more regions of interest is the same as the first resolution of full image frames detected at (702). In such examples, generating a digital image output at (706) can include retaining (e.g., without downsampling) raw image capture data detected at (702) inside the one or more regions of interest determined at (704) while downsampling raw image capture data detected at (702) outside the one or more regions of interest determined at (704) in accordance with the third resolution, which can be less than the first and second resolutions. In examples when both the second and third resolutions are less than the first resolution, generating a digital image output at (706) can include downsampling raw image capture data detected at (702) inside the one or more regions of interest determined at (704) in accordance with the second resolution and downsampling raw image capture data detected at (702) outside the one or more regions of interest determined at (704) in accordance with the third resolution. Generating a digital image output at (706) can include combining the image portions having a second resolution within the one or more regions of interest determined at (704) with the image portions having a third resolution outside the one or more regions of interest determined at (702).

After a digital image output is generated at (706), the digital image output can be provided as output data at (708) from the image capture device 100. In some examples, digital image output can be provided as output data at (708) from image capture device 100 to one or more other computing devices, processors or control devices. For example, digital image output can be provided as output data at (708) to a vehicle control system 602 as depicted in FIG. 6. In some examples, digital image output can be provided as output data at (708) for display on a display device associated with a vehicle such that a user can view one or more aspects of a vehicle's surrounding environment (e.g., surroundings near a front and/or rear bumper of a vehicle). In some examples, digital image output can be provided as output data at (708) to a vehicle control system 602 for an autonomous vehicle.

The digital image output provided at (708) can be further analyzed to identify at (710) at least one object in the digital image. The at least one object identified or detected at (710) can include one or more of a person (e.g., a pedestrian), an animal, a vehicle, a bicycle, a road, a road feature, a navigational object such as signage, a building, an object, road conditions (e.g., curves, potholes, dips, bumps, changes in grade), distances between vehicle 502 and other vehicles and/or objects, etc. In response to detection at (710) of at least one object in the digital image (or conversely, a detected absence of an object), one or more operational parameters of a vehicle can be controlled at (712). Operational parameters can include vehicle speed, direction, acceleration, deceleration, steering and/or operation of vehicle components to follow a planned motion and/or navigational course. In some examples, operational parameters can be controlled at (712) to navigate a vehicle in an autonomous or semi-autonomous operational mode.

Figure 8:
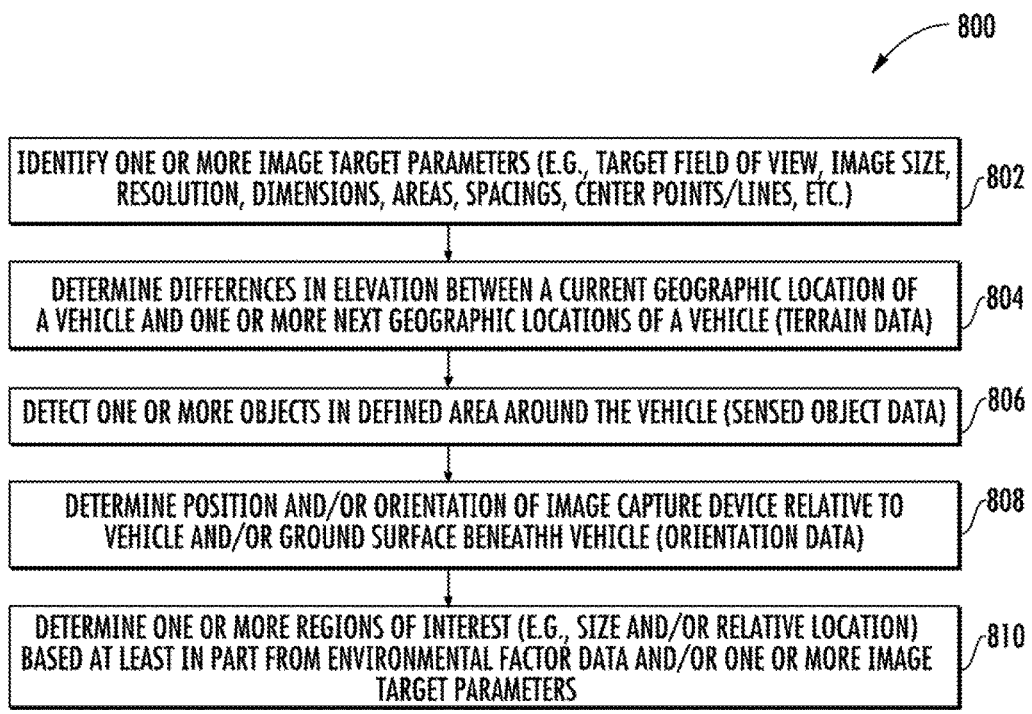
FIG. 8 depicts a flow diagram of an example method of determining one or more regions of interest within an image frame according to example embodiments of the present disclosure.

Referring now to FIG. 8, a method (800) for determining one or more regions of interest can more particularly include identifying at (802) one or more image target parameters. In some examples, image target parameters identified at (802) can correspond to image target parameters 128 of FIG. 1. Image target parameters identified at (802) can include, for example, image file size, resolution (e.g., a predetermined value or formula for determining a value of second resolution within regions of interest and third resolution outside regions of interest), dimensions (e.g., length, width or height dimensions), areas, spacings defining a relative location of regions of interest within a full image frame and/or target field of view, one or more center points or center lines defining a relative location of the regions of interest and/or target fields of view, etc. The image target parameters 128 can be defined in terms of absolute values, percentages and/or ranges relative to a full frame image and/or portion thereof.

In some examples, identifying image target parameters at (802) can include identifying a target field of view having a smaller area than a full image frame that establishes dimensions and/or boundary limitations within which one or more regions of interest can be determined. When image target parameters identified at (802) include a target field of view, one or more regions of interest can be dynamically determined such that the one or more regions of interest actively shift within the target field of view based on real time values of one more portions of environmental factor data.

Method 800 can include determining at (804) differences in elevation between a current geographic location of a vehicle 502 and one or more planned and/or predicted next geographic locations of a vehicle 502. Determining differences in elevation at (804) can be determined at least in part from mapping system 512 including one or more location sensors and features for accessing terrain data (e.g., one or more elevation databases) as discussed with reference to FIG. 5. In some examples, planned and/or predicted next geographic locations of a vehicle can be determined by looking a short distance ahead along a road or route currently navigated by vehicle 502. Planned and/or predicted next geographic locations of a vehicle can alternatively be determined by consulting one or more stored or predetermined navigational routes from one or more start locations to one or more destination locations that are determined locally at vehicle 502 and/or remotely at a central server location (e.g., a central computing system for controlling autonomous vehicle operation). Elevations at the various geographic locations can be determined from terrain data 122 associated with a current geographic location of a vehicle 502 and image capture device 100. Terrain data 122 determined at (804) can include elevation information (e.g., an altitude value) associated with a location (e.g., latitude and longitude coordinate values) as determined from an elevation database providing three-dimensional model values corresponding to different locations across the earth's surface.

Method 800 can include determining at (806) one or more sensed objects in a defined area around vehicle 502. In some examples, determining one or more sensed objects at (806) can be implemented by image capture device 100 and/or one or more additional sensor(s) 514 as discussed with reference to FIG. 5. One or more objects detected at (806) can include, for example, one or more of a person (e.g., a pedestrian), an animal, a vehicle, a bicycle, a road, a road feature, a navigational object such as signage, a building, an object, road conditions (e.g., curves, potholes, dips, bumps, changes in grade), distances between vehicle 502 and other vehicles and/or objects, etc.

Method 800 can include determining at (808) a position and/or orientation of an image capture device 100 relative to vehicle 502 and/or a ground surface 540 below vehicle 502. Determining a position and/or orientation of an image capture device 100 at (808) can be determined from orientation data 126 from one or more orientation sensors 516, for example, a compass, an accelerometer, a proximity sensor, or any other sensor or device configured to directly or indirectly detect relative position and orientation. In some examples, orientation and position of image capture device 100 determined at (808) can be additionally or alternatively based on terrain data 122 accessed when determining changes in elevation data at (804).

Method 800 can then determine one or more regions of interest within a full image frame based at least in part from the one or more image target parameters identified at (802), the differences in elevation determined at (804), the one or more sensed objects detected at (806), and/or the position and/or orientation of the image capture device determined at (808). A region of interest can be determined at (810) within a full image frame as depicted in FIG. 3 and/or within a target field of view corresponding to a smaller area or subset of a full image frame as depicted in FIG. 4. Determining one or more regions of interest at (808) can include determining a size of each region of interest (e.g., one or more of a height dimension or a height percentage corresponding to a portion of the height dimension of a full image frame or a target field of view and/or a width dimension or a width percentage corresponding to a portion of the width dimension of a full image frame or a target field of view). Determining one or more regions of interest at (808) can also include determining a relative location of each region of interest within a full image frame or within a target field of view. In some examples, relative location can be defined in terms of spacings from edges of a full image frame (e.g., top spacing 314, bottom spacing 316, left spacing 318, and/or right spacing 312 of FIG. 3) and/or spacings from edges of a target field of view (e.g., top spacing 440 and/or bottom spacing 442 of FIG. 4) and/or relative to one or more center points of center lines, such as center line 425 of FIG. 5.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An image capture device, comprising:
    one or more image sensors configured to detect incoming light provided incident to a surface of each image sensor, each image sensor configured to provide full image frames of image capture data at a plurality of pixels at a first resolution; and
    one or more image processors coupled to the one or more image sensors and configured to:
        receive the image capture data at the first resolution;
        identify, based at least in part on one or more image target parameters, one or more regions of interest within the image capture data; and
        provide a digital image output having a second resolution within the one or more regions of interest and a third resolution outside the one or more regions of interest by downsampling the image capture data outside the one or more regions of interest, wherein the downsampling comprises retrieving the image capture data at a subset of the plurality of pixels, and wherein the third resolution is less than the second resolution.

2. The image capture device of claim 1, wherein the one or more regions of interest are dynamically determined in real time within a target field of view having a smaller area than the full image frames of image capture data.

3. The image capture device of claim 1, wherein the image capture device is positioned relative to a vehicle, and wherein the image capture device further comprises one or more processors configured to receive one or more portions of environmental factor data comprising real time data indicative of one or more environmental factors defining the operational environment of the image capture device and to dynamically determine the one or more regions of interest based at least in part on the one or more portions of environmental factor data.

4. The image capture device of claim 3, wherein the one or more portions of environmental factor data comprise terrain data that provides elevation values for terrain associated with a current geographic location of the vehicle.

5. The image capture device of claim 3, wherein the one or more portions of environmental factor data comprise sensed object data that provides location data for one or more sensed objects around the vehicle.

6. The image capture device of claim 3, wherein the one or more portions of environmental factor data comprise orientation data that indicates orientation of the image capture device as positioned relative to the vehicle.

7. The image capture device of claim 3, wherein the second resolution within the one or more regions of interest is the same as the first resolution at which the image capture data was obtained by the one or more image sensors.

8. The image capture device of claim 1, wherein the one or more image processors comprise a field-programmable gate array (FPGA) configured to actively control processing of the image capture data in accordance with the one or more regions of interest.

9. The image capture device of claim 1, wherein the one or more regions of interest are defined by a height dimension that is between about 5 percent and about 25 percent of a height dimension of each full image frame of the image capture data detected by the one or more image sensors.

10. A vehicle computing system, comprising:
one or more processors configured to receive one or more portions of environmental factor data comprising real time data indicative of one or more environmental factors defining the operational environment of an image capture device positioned relative to a vehicle, and to dynamically determine one or more regions of interest within a full image frame of image capture data based at least in part on the one or more portions of environmental factor data and on one or more image target parameters; and
an image capture device positioned relative to the vehicle, the image capture device including:
one or more image sensors for detecting incoming light provided incident to a surface of each image sensor, each image sensor configured to provide full image frames of image capture data at a plurality of pixels at a first resolution; and
one or more image processors coupled to the one or more image sensors for receiving the image capture data at the first resolution and providing a digital image output having a second resolution within one or more regions of interest and a third resolution outside the one or more regions of interest by downsampling the image capture data outside the one or more regions of interest, wherein the downsampling comprises retrieving the image capture data at a subset of the plurality of pixels.

11. The vehicle computing system of claim 10, further comprising a vehicle controller configured to detect at least one object of interest within the one or more regions of interest in the digital image output, and to control at least one operational parameter of a vehicle based at least in part on the at least one object of interest detected within the one or more regions of interest in the digital image output.

12. The vehicle computing system of claim 10, wherein the one or more portions of environmental factor data comprise one or more of terrain data that provides elevation values for terrain associated with a current geographic location of the vehicle, sensed object data that provides location data for one or more sensed objects around the vehicle, or orientation data that indicates orientation of the image capture device as positioned relative to the vehicle.

13. The vehicle computing system of claim 10, wherein the one or more regions of interest are dynamically determined in real time within a target field of view having a smaller area than the full image frame of image capture data.

14. The vehicle computing system of claim 10, wherein the second resolution within the one or more regions of interest is the same as the first resolution at which the image capture data was obtained by the one or more image sensors.

15. The vehicle computing system of claim 10, wherein the one or more image processors comprise a field-programmable gate array (FPGA) configured to actively control processing of the image capture data in accordance with the one or more regions of interest.

16. A method, comprising:
detecting, by one or more image sensors of an image capture device, full image frames of raw image capture data at a plurality of pixels and characterized by a first resolution;
determining, by one or more processing devices, one or more regions of interest within the full image frames of raw image capture data, wherein the one or more regions of interest are determined based at least in part on one or more image target parameters and one or more portions of environmental factor data including real time data indicative of one or more environmental factors defining the operational environment of the image capture device as positioned relative to a vehicle;
generating, by the one or more processing devices, a digital image output characterized by a second resolution within the one or more regions of interest and a third resolution outside the one or more regions of interest by downsampling the raw image capture data outside the one or more regions of interest, wherein the downsampling comprises retrieving the raw image capture data at a subset of the plurality of pixels.

17. The method of claim 16, wherein determining, by the one or more processing devices, one or more regions of interest based at least in part on one or more image target parameters comprises:
identifying, by the one or more processing devices, the one or more image target parameters defining a target field of view having a smaller area than a full image frame, wherein the target field of view establishes dimensions and/or boundary limitations within which one or more regions of interest can be determined; and
determining, by the one or more processing devices, the one or more regions of interest within the target field of view, wherein the one or more regions of interest actively shift within the target field of view based on the real time values of the one more portions of environmental factor data.

18. The method of claim 16, wherein determining, by the one or more processing devices, one or more regions of interest comprises:
determining, by the one or more computing devices, a position and orientation of the image capture device relative to a ground surface below the vehicle; and
determining, by the one or more computing devices, the one or more regions of interest based at least in part on the position and orientation of the image capture device relative to the ground surface below the vehicle.

19. The method of claim 16, further comprising:
detecting, by the one or more processing devices, at least one object in the digital image output, wherein the at least one object comprises one or more of a person, a vehicle, a road, or a navigational object; and controlling, by the one or more processing devices, an operational parameter of a vehicle in response to the detection of the at least one object in the digital image output.

20. The method of claim 16, wherein the one or more regions of interest are defined by a height dimension that is between about 5 percent and about 25 percent of a height dimension of each full image frame of raw image capture data detected by the one or more image sensors, and wherein the second resolution within the one or more regions of interest is the same as the first resolution at which the raw image capture data was obtained by the one or more image sensors, and wherein the third resolution outside the one or more regions of interest is at least about fifty percent less than the first and second resolutions.

* * * * *